United States Patent [19]
Dowling et al.

[11] 3,890,502
[45] June 17, 1975

[54] PERMEABILITY LOG USING NEW LIFETIME MEASUREMENTS

[75] Inventors: Donald J. Dowling; John F. Boyd; James A. Fuchs, all of Houston, Tex.

[73] Assignee: Texaco Inc., New York, N.Y.

[22] Filed: Dec. 20, 1973

[21] Appl. No.: 426,873

[52] U.S. Cl................................ 250/267; 250/269
[51] Int. Cl............................................. G01t 1/00
[58] Field of Search .......... 250/262, 253, 261, 270, 250/256, 258, 267; 181/.5 BE; 250/269

*Primary Examiner*—Harold A. Dixon
*Attorney, Agent, or Firm*—T. H. Whaley; C. G. Ries; William J. Beard

[57] ABSTRACT

Comparative measurements of thermal neutron decay time are obtained for a formation after irradiation with a pulsed neutron source. Chloride ions in formation fluids are concentrated by the electrosmosis effect using charged poles on a well logging sonde. The formation is irradiated with fast neutrons and a first comparative measure of the thermal neutron decay time or neutron lifetime is taken. The chloride ions are then disbursed by acoustic pumping with a magnetostrictive transducer. The formation is then again irradiated with fast neutrons and a comparative measure of neutron lifetime is taken. The comparison is a function of the variation in chloride concentration between the two measurements which is related to formation permeability.

15 Claims, 2 Drawing Figures

PERMEABILITY LOG USING NEW LIFETIME MEASUREMENTS

BACKGROUND OF THE INVENTION

The proposed method and apparatus of the present invention relate to measurement of formation permeability. In large areas of the world, salt water is normally found in conjunction with petroleum deposits. A measure of salt concentration yields a measure of the water saturation $S_w$ in the vicinity. By combining these measurements with porosity and lithology measurements, estimations of movable hydrocarbon can be made. The fluid in the vicinity of the well bore is located in the interstices or connected pore spaces of the formation. The ability of the fluid in the formation to move is defined as formation permeability. In a highly permeable formation, the formation fluids are relatively free to move. In a formation with low or poor permeability, formation fluids cannot readily move.

The apparatus of the present invention is directed to a device which induces movement of formation fluids. Taking measurements of the chloride ion concentration before and after movement obtains a measure of permeability. The invention particularly takes advantage of the relatively large capture thermal neutron cross-section of chlorine. In comparison with other common elements, chlorine has a significant thermal neutron capture cross-section. The formation is bombarded with repetitive pulse of high energy neutrons. The high energy neutrons tend to lose energy by scattering and become thermalized. The thermal neutrons are captured at a rate dependent inter alia but primarily, upon the concentration of chlorine in the formation. In other words, a formation with a substantial chlorine concentration will exhibit a relatively high macroscopic capture cross section, $\Sigma$.

Upon capture of a thermal neutron the chlorine nucleus gives off characteristic gamma radiation which can be detected by a detector. By measuring the intensity of gamma radiation as a function of time after irradiation of a formation with a neutron pulse, a quantity known as $\gamma$, the thermal neutron decay time, may be measured. The thermal neutron decay time $\gamma$ is related in a known manner to the macroscopic thermal neutron capture cross-section $\Sigma$. Thus by concentrating the chloride ions in a formation and measuring the thermal decay time $\gamma$ with the ions concentrated, then disbursing the concentrated chloride ions and making a second measurement of $\gamma$, the difference $\gamma$ (and hence $\Sigma$) is indicative of the macroscopic mobility of chloride ions in the formation. This mobility may then be associated as a measure of the fluid permeability of the formation.

BRIEF DESCRIPTION OF THE INVENTION

The method and apparatus of the present invention enable measurement of the permeability of a downhole formation. The formation is bombarded with high energy neutrons. They tend to scatter and are thermalized. The thermal neutrons are captured at a rate which is a function of the macroscopic capture cross-section $\Sigma$ which in the presence of chlorine is substantially larger than with formations having a minimum of chlorine. Chloride ions are first concentrated in the vicinity of a sonde by attracting the chloride ions in solution in the formation fluid to a charged pole or electrode. After concentration, a pulsed neutron source is activated, bombarding the formation. The thermal decay time of the formation is measured and a first value of $\gamma$ is obtained. The formation is then acoustically agitated and the electric charge on the pole is removed. Agitation redistributes the chloride ions in the formation. The ion movement is a function of formation permeability. The formation again is bombarded with high energy neutrons and another measurement of thermal neutron decay time is taken. The difference in the measurements of $\gamma$ is a function of chloride ion movement in the formation and is therefore related to formation permeability.

DESCRIPTION OF THE PREFERRED EMBODIMENT

Figure 1:
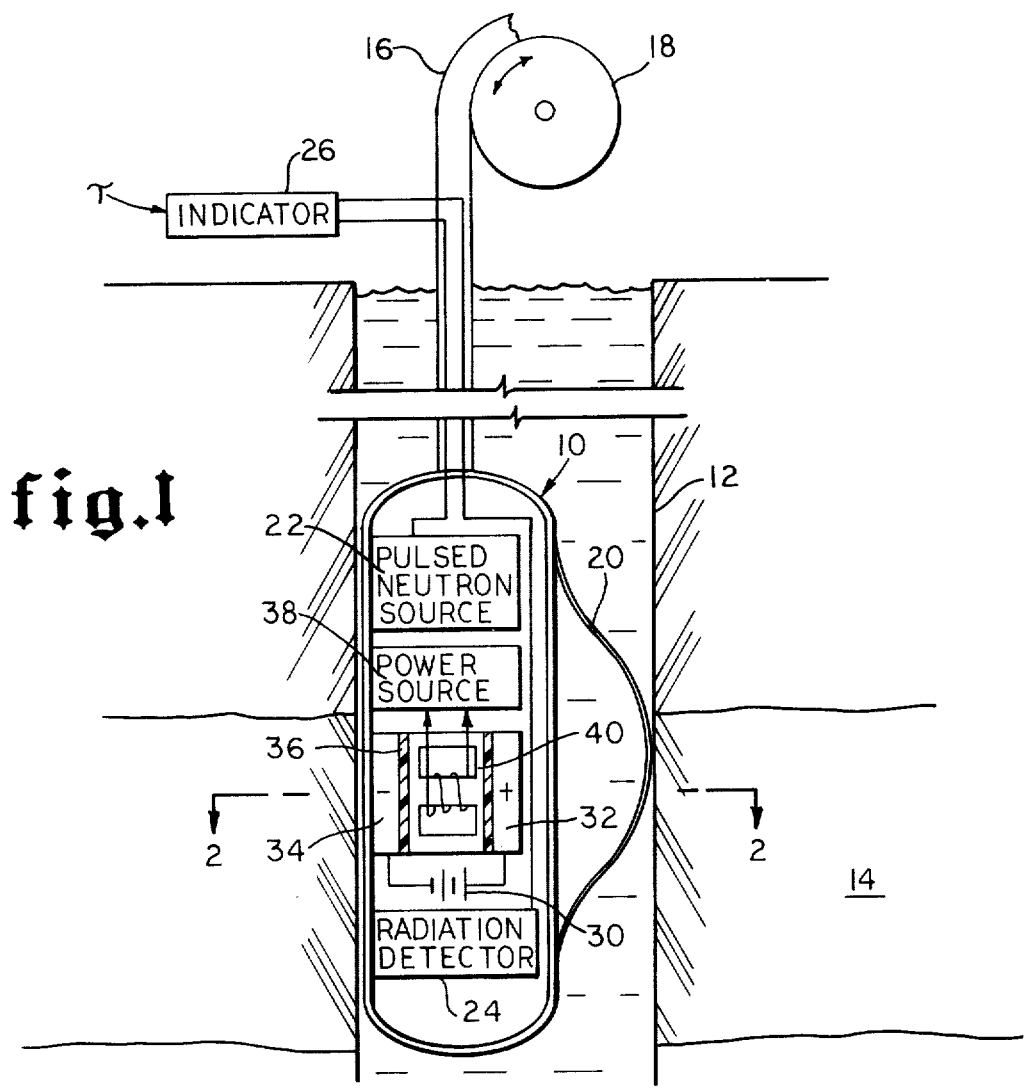
FIG. 1 shows an apparatus in accordance with the present invention in a well bore for measurement of formation permeability; and, FIG. 2 is a sectional view along the line 2-2 of FIG. 1 schematically illustrating a concentration of chloride ions in the vicinity of the measuring device.

Attention is first directed to FIG. 1 of the drawings where a well logging tool 10 is positioned in a well bore 12 adjacent to an earth formation of interest indicated at 14. The sonde 10 is suspended on a well logging cable 16 of 20,000 feet or more in length and is adapted to be lowered or raised to various depths in the well 12 to measure the permeability of various formations. The cable 16 extends to a surface apparatus including a drum 18 which is adapted to raise and lower the cable 16. The cable thus supports the sonde 10 in the well bore.

The sonde 10 preferably incorporates a decentralizer or bow spring 20 which selectively forces it to one side of the bore subject to control from the surface using known means. The sonde 10 incorporates a pulsed neutron source 22 such as that disclosed in U.S. Pat. No. 2,991,364 and a thermal neutral detector 24 such as a scintillation crystal coated with boron trifluoride. Alternatively a gamma ray detector such as a thallium (Tl) activated sodium or cessium iodide crystal may be used to detect gamma rays produced by the capture of thermalized neutron by nuclei of atoms comprising the formation and formation pore fluids. The pulsed neutron source 22 and the thermal neutron detector 24 are connected to a circuit which measure the thermal neutron population in the vicinity of the detector. By making two or more such measurements at shortly spaced time intervals, the decay time $\gamma$ may be obtained. One example of a method which measures the thermal decay time $\gamma$ is illustrated in U.S. Pat. No. 3,566,116. Briefly, the high energy neutrons from the pulsed neutron source 22 are scattered or thermalized by the formation 14 due to inelastic neutron scattering interactions with the materials comprising the formation. After a few microseconds a thermal neutron cloud is produced. The thermal neutrons are then captured at a rate proportionate to $\Sigma$, the macroscopic thermal neutron capture cross-section of the formation. The element chlorine is noteworthy in that it has a significantly larger capture cross-section than other elements commonly found in earth formations. In other words, the most significant contributing factor in $\Sigma$ is usually the chlorine concentration in the formation.

As described in the above mentioned reference patent, the thermal decay time $\gamma$ is determined by the counting rate achieved in gated time intervals after a neutron pulse. The time intervals can be altered until a desired comparison between the counting rates of two gated intervals is achieved at which time the duration of the gated intervals is related to the thermal decay time $\gamma$. Once $\gamma$ is obtained, the macroscopic capture cross-section $\gamma$, unduly influenced by chlorine, is obtained. Alternative methods of measuring the formation response to high energy neutron bombardment utilizes detection of characteristic gamma radiation from the chlorine laden formation. The gamma radiation resulting from capture of high energy neutrons falls within a selected spectrum, enabling detection and quantification.

The sonde 10 includes a battery 30 and is connected to a pair of spaced electric plates or poles 32 and 34 on opposite sides of the sonde. One pole is made positive and the other is made negative. They are preferably spaced apart by means of an insulator 36 which isolates them from adjacent apparatus. The electrically charged poles or plates attract ions in solution which are free to move in the formation 14. By way of background, salt water in a formation includes chloride ions in solution which are relatively free to migrate. They comprise a charged particle, and therefore respond to an electric field in the formation 14. The chloride ions thus migrate to an extent which is a function of the formation permeability, electric field strength and other factors. By the same token, sodium ions tend to migrate to the other pole. In any case, chloride ions are concentrated in the near vicinity of the sonde 10 by the electric field which is imposed on the formation 14.

A power source 38 is incorporated and is connected to a magnetostrictive transducer 40. Ideally, the magnetostrictive transducer 40 is located in the near vicinity of the charged poles. The magnetostrictive transducer 40 is capable of pumping substantial acoustic energy into the adjacent formation. It provides an energy source which agitates the fluid in the formation 14. Just as the charged poles 32 and 34 provide a concentration of chloride ions in the vicinity of the sonde 20, the magnetostrictive transducer 40 agitates and disburses the ions, returning them to a random and electrically neutral distribution in the formation. In order words, the sonde 10 includes a means for concentrating the charged ions. It additionally includes a means for disbursing them, returning the formation to a randomly disbursed distribution of chloride ions.

The magnetostrictive source can be sonic or ultrasonic. The frequency and power level are not particularly critical.

Figure 2:
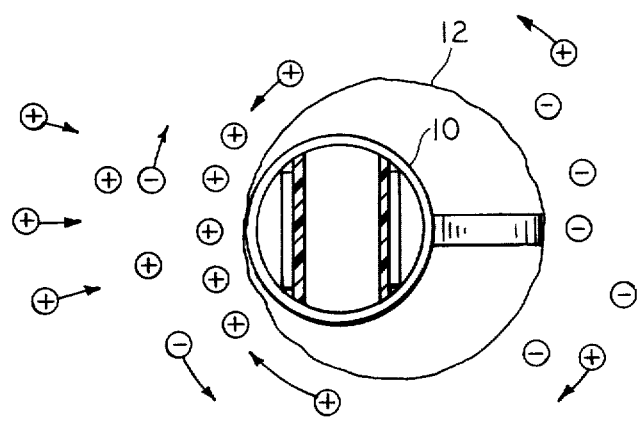

The method of the present invention contemplates the following steps. The sonde 10 is lowered on the cable 16 in response to the surface equipment 18 to a point adjacent to a formation 14 which is of interest. The battery 30 is connected to the plates 32 and 34. The electric field in the vicinity of the sonde created by the plates 32 and 34 alters the localized concentration of chloride ions. By way of example, FIG. 2 shows charged particles in the formation which migrate in response to the electric field. The positively charges ions congregate near the negative pole of the sonde 10. The apparatus thus causes some of the chloride ions to migrate in the formation, the extent of migration being a function of formation permeability, to the near vicinity of the sonde. After a suitable time has elapsed (on the order of 1 or 2 seconds) where the concentration of chloride ions is increased by the electric field, the neutron source 22 is activated and the formation is bombarded with high energy neutrons.

The detector 24 provides a raw measure of thermal neutrons population in its vicinity. The thermal neutron decay time of the formation $\gamma$ is obtained by the indicator 26. The first measure of $\gamma$ is taken with the chloride ions concentrated near the sonde 10. To the extent that the formation has a high measure of permeability, and salt in solution is found in the formation pore fluids, the first measure of $\gamma$ will be reduced in comparison with a second measure of $\gamma$ to be described.

Subsequently, the battery 30 is disconnected from the poles 32 and 34 removing the electric field from the vicinity of the sonde 10. Afterwards, the ions which had been previously polarized tend to disburse to an electrically neutral state. Unaided, the return to a non-polarized state may require a lengthy interval. While it is permissible to wait for the migration to be completed, the preferred method of the invention contemplates acoustic agitation of the solution in the formation to speed the neutralization process. To this end, the magnetostrictive transducer 40 is powered for a short interval to agitate the ions, returning them to an electrically neutral distribution. Once the acoustic excitation is completed, the pulsed neutron source is again activated and the formation 14 is bombarded in the same manner as before. The detector 24 again detects the thermal neutron population and a measure of thermal decay time $\gamma$ is obtained.

The second measure of $\gamma$ differs from the first as a function of macroscopic capture cross-section $\Sigma$, electric field intensity, duration of acoustic pamping, and other factors. The later factors are merely scale factors which, if held constant, do not alter the measured results. However, the change in formation capture cross section, or $\Delta\Sigma$, is a measure of formation permeability.

The thermal decay time is measured rather quickly (on the order of 1 millisecond) permitting two or three values to be taken of the formation 14. From time to time, it is helpful to measure the background or pre-existent thermal neutron activity. As mentioned in the reference, the background value is subtracted from the raw count rates measured by the detector.

The change in formation macroscopic thermal neutron capture cross-section, coupled with lithology and porosity information of the vicinity of the well, provides an indication of the productive capabilities of the formation 14.

The method of the present invention particularly contemplates a means of measuring the chloride concentration. The chloride ions are forced to migrate and remigrate in the formation in response to the electric field and then acoustic pumping.

The tool 10 can be lowered to any selected formation after a measurement has been taken and another set of measurements can be quickly accomplished.

The foregoing has been directed to the preferred method and apparatus of the invention. The true nature and scope is determined by the claims which are as follows.

We claim:
1. A method of measuring permeability of an earth formation adjacent to a borehole which comprises the steps of altering the natural charged ion spatial distribution in formation fluids;

repetitively bombarding the formation with fast neutrons from a pulsed neutron source to create a cloud of thermal neutrons in the formation;

measuring a thermal neutron decay time characteristic of the earth formations during said altered spatial distribution of charged ions;

measuring a thermal neutron decay time for some earth formation having an unaltered spatial distribution of charged ions; and comparing the two measures to obtain an indication of formation permeability.

2. The method of claim 1 wherein the step of altering the ion concentration includes imposing a polarizing electric field on the formation.

3. The method of claim 1 wherein the formation is first polarized with an electric field which tends to collect ions in a selected portion of the formation, and thereafter agitating the ions to randomly redistribute the ions to an electrically neutral or uniform spatial distribution state.

4. The method of claim 1 wherein the step of measuring the thermal neutron decay time is performed by making at least two time gated measures of the thermal neutron population after each fast neutron pulse.

5. The method of claim 1 including the step of acoustically exciting the formation to agitate the formation and spatially redistribute the ions therein.

6. The method of claim 1 wherein the neutron population is measured primarily in the vicinity of polarized ions in the formation thereby enhancing differences in spatial distribution.

7. The method of claim 6 wherein said measurements of the thermal neutron population are made by a detector urged against the borehole wall on the side of a sonde polarized in a positive electrical sense.

8. The method of claim 1 wherein the step of bombarding is carried out after an electric field has been imposed on the formation to alter ionic spatial distribution in the formation in the vicinity of the borehole.

9. The method of claim 1 including the step of positioning positive and negative electric poles against the formation by urging a well tool against one wall of a borehole.

10. The method of claim 1 including the step of placing a polarizing electric field on the formation which tends to separate and spatially redistribute cations and anions in solution in the formation pore fluids, and thereafter rearranging the separated cations and anions by acoustically vibrating the formation to spatially redistribute the cations and anions in solution the formation fluids as a function of permeability.

11. An apparatus for measuring permeability in a formation adjacent to a bore hole comprising:

a down hole tool;

a pulsed neutron source carried by said downhole tool;

a radiation detector carried by said down hole tool for measuring a thermal decay time of neutrons from the formation as a consequence of irradiation by said neutron source; and, means for creating an electric field carried by said down hole tool for attracting ions in solution in the formation fluids, said last named means being operable before said neutron source.

12. The apparatus of claim 11 including a sonic transducer for selectively agitating the formation.

13. The apparatus of claim 12 wherein said transducer includes a magnetostrictive transducer positioned near said electric field creating means.

14. The apparatus of claim 11 including a voltage source and a pair of insulated and spaced electric poles.

15. The apparatus of claim 14 including insulator means isolating said poles.

* * * * *